United States Patent
Chen et al.

(10) Patent No.: US 7,049,779 B2
(45) Date of Patent: May 23, 2006

(54) MOTOR DRIVE CONTROL APPARATUS, MOTOR DRIVE CONTROL METHOD AND PROGRAM OF THE SAME

(75) Inventors: Zhiqian Chen, Anjo (JP); Isao Fujiwara, Anjo (JP)

(73) Assignee: Aisin A W Co., Ltd., Anjo (JP)

( * ) Notice: Subject to any disclaimer, the term of this patent is extended or adjusted under 35 U.S.C. 154(b) by 0 days.

(21) Appl. No.: 11/187,020

(22) Filed: Jul. 22, 2005

(65) Prior Publication Data

US 2006/0049792 A1    Mar. 9, 2006

(30) Foreign Application Priority Data

Sep. 9, 2004   (JP) .............................. 2004-261803

(51) Int. Cl.
   *G05B 11/28* (2006.01)

(52) U.S. Cl. .................. 318/599; 318/254; 318/567; 318/802; 318/439; 369/59.11; 363/37

(58) Field of Classification Search ................ 318/138, 318/245, 254, 439, 599, 802; 369/59.11; 363/37
   See application file for complete search history.

(56) References Cited

U.S. PATENT DOCUMENTS

| | | | | |
|---|---|---|---|---|
| 6,903,523 B1 * | 6/2005 | Peterson | ..................... | 318/138 |
| 2004/0017172 A1 * | 1/2004 | Hoashi et al. | .............. | 318/599 |
| 2004/0095090 A1 * | 5/2004 | Nukushina | ................... | 318/800 |
| 2004/0174723 A1 * | 9/2004 | Yamanaka et al. | ............ | 363/37 |
| 2004/0179830 A1 * | 9/2004 | Sunaga et al. | .............. | 388/804 |
| 2004/0245953 A1 * | 12/2004 | Peterson | .................... | 318/439 |
| 2005/0017672 A1 * | 1/2005 | Suzuki et al. | ............... | 318/802 |
| 2005/0184693 A1 * | 8/2005 | Shimada et al. | ............ | 318/432 |
| 2005/0213461 A1 * | 9/2005 | Tabata et al. | ............ | 369/59.11 |

FOREIGN PATENT DOCUMENTS

JP         06-078558 A         3/1994

* cited by examiner

*Primary Examiner*—Paul Ip
(74) *Attorney, Agent, or Firm*—Oliff & Berridge, PLC

(57) ABSTRACT

In switching between asynchronous PWM control and synchronous PWM control, control can be simplified. An apparatus has a first pulse pattern generation processing module which generates a synchronous PWM signal in a first pulse pattern formed of multiple pulses defined in accordance with two or more parameters based on a voltage command value, and a second pulse pattern generation processing module which generates a synchronous PWM signal in a second pulse pattern formed of a single pulse. The first pulse pattern generation processing module modifies the individual parameters in switching pulse patterns between the first pulse pattern and the second pulse pattern. The individual parameters are modified to move the pulse patterns, and thus control can be simplified.

20 Claims, 6 Drawing Sheets

MOTOR DRIVE CONTROL APPARATUS, MOTOR DRIVE CONTROL METHOD AND PROGRAM OF THE SAME

This application claims priority from JP2004-261803, filed Sep. 9, 2004, this disclosure of which is incorporated in its entirety herein by reference thereto.

BACKGROUND

The disclosure relates to a motor drive control apparatus, a motor drive control method and a program of the same.

Traditionally, in a drive motor or generator disposed as a motor machine, a rotor is rotatably disposed which has a magnetic pole pair formed of north- and south-pole permanent magnets, and a stator is disposed in the outward radial direction from the rotor. The stator has coils of U-phase, V-phase, and W-phase.

A motor drive apparatus and a motor drive control apparatus which controls the motor drive apparatus are provided in order to drive the drive motor or the generator to generate drive motor torque, which is the torque of the drive motor, or generator torque, which is the torque of the generator. A drive motor control unit is provided which drives the drive motor and a generator control unit is provided which drives the generator and each constitutes a motor machine control unit. Asynchronous pulse width modulation (PWM) signals of U-phase, V-phase, and W-phase generated in the motor machine control unit are sent to an inverter, and phase currents generated in the inverter, that is, the currents in U-phase, V-phase, and W-phase, are fed to the individual stator coils for asynchronous PWM control which generates the drive motor torque or the generator torque.

In the asynchronous PWM control, when the asynchronous PWM signals in the individual phases are generated, voltage in the individual phases is applied to each of the stator coils. In the area where low voltage is applied, the asynchronous PWM signal is generated in a sine wave PWM pattern, whereas in the overmodulation area where the voltage becomes high, i.e., the sine wave peak exceeds the battery voltage, the asynchronous PWM signal is generated in an overmodulated PWM pattern. In this case, the amplitude of voltage in the individual phases that can be applied to each of the stator coils has an upper limit. When the voltage to be applied exceeds the upper limit, voltage command value computation cannot follow the variation in the current command value in proportional integral computing, causing vibrations in the voltage command value required a overmodulated PWM pattern.

In addition, switching timing by transistors of the inverter is not synchronous with the voltage phase angle indicative of the phase of the voltage command value. Thus, when the drive motor is to be driven in the high-speed rotation area, vibrations are generated in the voltage in the individual phases, leading to a beat phenomenon.

Therefore, switching between the asynchronous PWM control and synchronous PWM control, for example, rectangular wave voltage control is allowed. The asynchronous PWM signal is generated in a sine wave PWM pattern or in an overmodulated PWM pattern in the medium-speed rotation area or low-speed rotation area for the asynchronous PWM control, and the synchronous PWM signal is generated in a one-pulse pattern with a single pulse in the high-speed rotation area for the rectangular wave voltage control as found in, for example, JP-A-06-078558.

When the synchronous PWM signal is generated in the one-pulse pattern in the rectangular wave voltage control, a voltage can be applied as it exceeds the upper limit of the amplitude of voltage, but an impulse is generated in the motor drive apparatus due to a harmonic component contained in the synchronous PWM signal in the one-pulse pattern when the asynchronous PWM control is switched to the rectangular wave voltage control in the one-pulse pattern.

In switching from the asynchronous PWM control to the rectangular wave voltage control, the synchronous PWM signal is generated in a five-pulse pattern where a harmonic component is small, the synchronous PWM signal is subsequently generated in a three-pulse pattern where a harmonic component is small in the high-voltage area, and then the synchronous PWM signal is generated in a one-pulse pattern.

SUMMARY

However, in the traditional motor drive control apparatus, when the synchronous PWM signal is to be generated in the individual pulse patterns of the five-pulse pattern, three-pulse pattern and one-pulse pattern, control is complicated leading to a cost increase in the motor drive control apparatus.

An object is to solve the problem of the traditional motor drive control apparatus, and to provide a motor drive control apparatus, a motor drive control method and a program of the same, which allow simplified control in switching between the asynchronous PWM control and the synchronous PWM control and achieve a cost reduction.

To this end, an exemplary motor drive control apparatus includes a first pulse pattern generation processing module which generates a synchronous PWM signal in a first pulse pattern formed of multiple pulses defined in accordance with two or more parameters based on a voltage command value; and a second pulse pattern generation processing module which generates a synchronous PWM signal in a second pulse pattern formed of a single pulse based on a voltage command value.

The first pulse pattern generation processing module has a pulse pattern modification processing module which modifies the individual parameters based on a change in voltage amplitude in switching pulse patterns between the first pulse pattern and the second pulse pattern.

In this case, the individual parameters are modified to move pulse patterns between the first pulse pattern and the second pulse pattern. Therefore, direct switching from the first pulse pattern to the second pulse pattern is allowed to simplify control. In addition, the cost of the motor drive control apparatus can be reduced.

An exemplary motor drive control method includes generating a synchronous PWM signal in a first pulse pattern formed of multiple pulses defined in accordance with two or more parameters based on a voltage command value; and generating a synchronous PWM signal in a second pulse pattern formed of a single pulse based on a voltage command value. The individual parameters are modified based on a change in voltage amplitude in switching pulse patterns between the first pulse pattern and the second pulse pattern.

An exemplary program of a motor drive control method allows a computer to function as a first pulse pattern generation processing module which generates a synchronous PWM signal in a first pulse pattern formed of multiple pulses defined in accordance with two or more parameters based on a voltage command value; and a second pulse pattern generation processing module which generates a synchronous PWM signal in a second pulse pattern formed of a single pulse based on a voltage command value.

BRIEF DESCRIPTION OF THE DRAWINGS

The disclosure can be readily understood by considering the following detailed description in conjunction with the accompanying drawings, in which.

DETAILED DESCRIPTION OF EMBODIMENTS

Hereinafter, exemplary embodiments will be described with reference to the drawings. In this case, a motor drive control apparatus adapted to a drive motor control unit as a motor machine control unit will be described.

Figure 2:
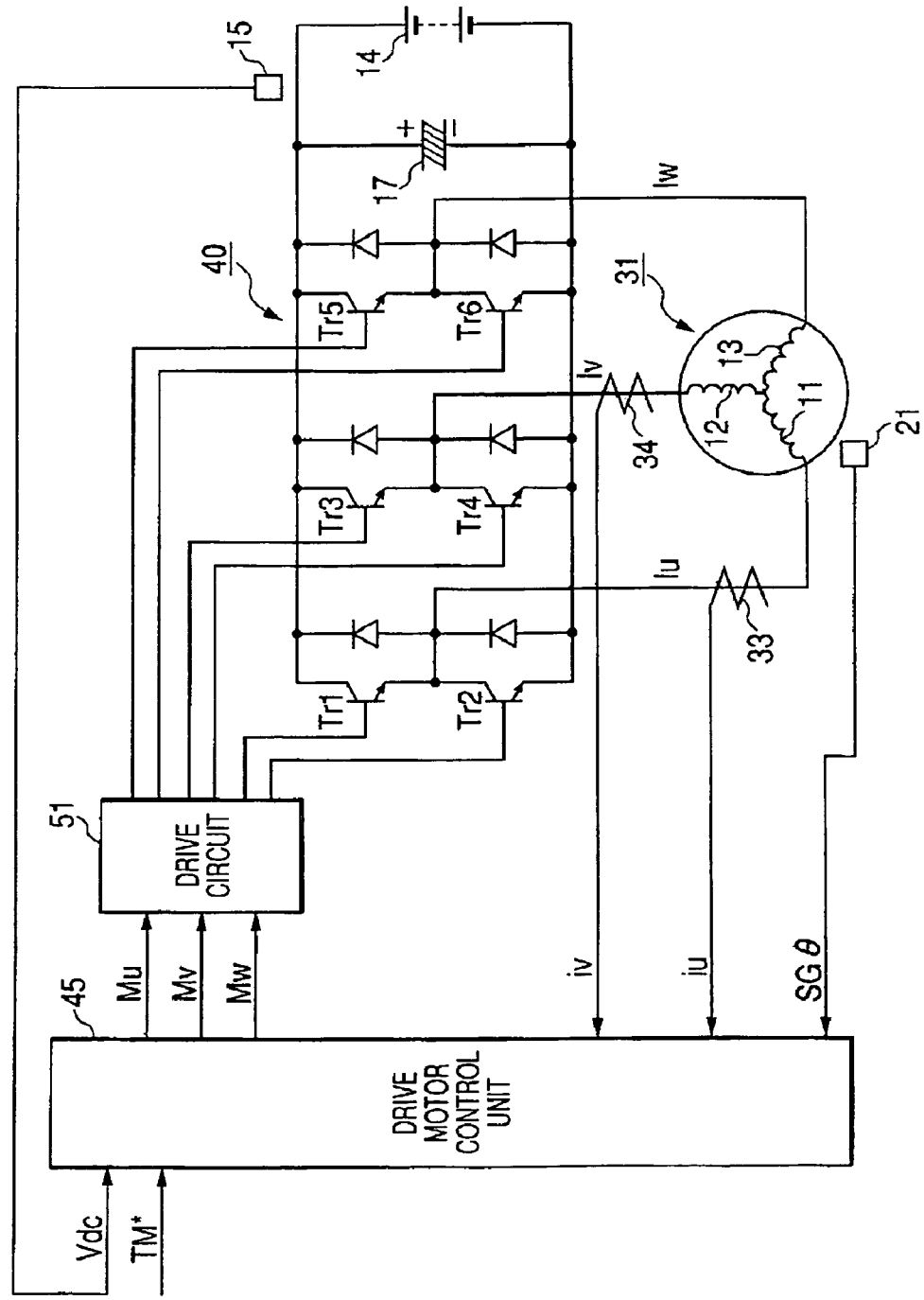
FIG. 2 is a conceptual diagram illustrating a motor drive control apparatus of the first exemplary embodiment.

In FIG. 2, 31 denotes a drive motor as a motor machine. The drive motor 31 has a rotor (not shown) which is mounted on a drive shaft of a motor vehicle, such as an electric car, and is rotatably disposed thereon. A stator of the drive motor 31 is disposed in the outward radial direction from the rotor. The rotor has a rotor core, and a permanent magnet which is disposed at multiple places at equal pitches in the circumferential direction of the rotor core. A magnetic pole pair is configured of the south pole and the north pole of the permanent magnet. The stator has a stator core with teeth which project toward the inward radial direction at multiple places in the circumferential direction. Stator coils 11 to 13 of U-phase, V-phase, and W-phase coils are wound on the teeth.

On the output axis of the rotor, a magnetic pole position sensor 21 is disposed as a magnetic pole position detecting part that detects the magnetic pole position of the rotor. The magnetic pole position sensor 21 generates the magnetic pole position signal SGθ as a sensor output, and sends it to a drive motor control unit 45. In the embodiment, a resolver is used as the magnetic pole position sensor 21.

In order to drive the drive motor 31 to run the electric car, an inverter 40, as a current generating unit, converts direct current from a battery 14 to phase current, that is, the currents Iu, Iv, Iw in U-phase, V-phase, and W-phase, and the currents Iu, Iv, Iw in the individual phases are fed to the stator coils 11 to 13.

To this end, the inverter 40 has six transistors Tr1 to Tr6 as switching devices. It sends a drive signal generated in a drive circuit 51 to the individual transistors Tr1 to Tr6, and selectively switches the individual transistors Tr1 to Tr6 on and off to generate the currents Iu, Iv, Iw in the individual phases. For the inverter 40, a power module, such as an insulated gate bipolar transistor (IGBT), that two to six switching devices are assembled in a single package can be used, or intelligent power module (IPM) formed by assembling a drive circuit in an IGBT can be used.

At the inlet side in feeding current from the battery 14 to the inverter 40, a voltage sensor 15 is disposed as a voltage detecting part. The voltage sensor 15 detects the DC voltage Vdc on the inlet side of the inverter 40, and sends it to the drive motor control unit 45. In addition, the battery voltage can be used as the DC voltage Vdc. In such a case, a battery voltage sensor is disposed, as the voltage detecting part, on the battery 14.

The motor drive apparatus is configured of the drive motor 31, the inverter 40, the drive circuit 51, and drive wheels (not shown). A condenser is denoted by reference no. 17.

Because the stator coils 11 to 13 are connected in a star topology, the current values of two phases are determined in the individual phases and then the current value of the remaining phase is determined. Thus, in order to control the currents Iu, Iv, Iw in the individual phases, for example, current sensors 33, 34 are disposed as current detecting parts which detect the U-phase current Iu and V-phase current Iv on the lead wire of the U-phase and V-phase stator coils 11, 12. The current sensors 33, 34 send the detected currents, as the detected currents iu, iv, to the drive motor control unit 45.

In addition to a central processing unit (CPU) which functions as a computer, a recording unit, such as RAM and ROM, which stores data and various programs is disposed in the drive motor control unit 45. The CPU and the recording unit are not shown, and first and second current command value maps are set in the recording unit. A micro-processing unit (MPU) can be used instead of the CPU.

Although the ROM is configured to store various programs and data, programs and data can be stored in other recoding media, such as a hard drive provided as an external storage. In this case, for example, flash memory is disposed on the drive motor control unit 45, and the programs and data are read out of the recording medium, and are stored in the flash memory. Therefore, the external recording medium can be replaced to update the programs and data.

The operation of the drive motor control unit 45 will now be described. First, a position detection processing module (not shown) of the drive motor control unit 45 conducts a position detection process. It reads the magnetic pole position signal SGθ sent from the magnetic pole position sensor 21, and detects the magnetic pole position θ based on the magnetic pole position signal SGθ. A rotational speed computation processing module of the position detection processing module conducts a rotational speed computation process. It computes the angular velocity ω of the drive motor 31 based on the magnetic pole position signal SGθ. The rotational speed computation processing module also computes the drive motor rotational speed N, i.e., the rotational speed of the drive motor 31, based on the angular velocity ω where the number of the magnetic poles is p:

$N=60 \cdot (2/p) \cdot \omega/2\pi.$

The drive motor rotational speed N is the motor machine rotational speed.

A detected current acquisition processing module (not shown) of the drive motor control unit 45 conducts a detected current acquisition process. It reads and acquires the currents iu, iv, and computes the detected current iw based on the detected currents iu, iv for acquisition:

$iw=-iu-iv.$

A drive motor control processing module (not shown) of the drive motor control unit 45 conducts a drive motor control process. It drives the drive motor 31 based on the drive motor target torque TM* indicative of the target value of the drive motor torque TM, which is the torque of the drive motor 31, the detected currents iu, iv, iw, the magnetic pole position θ, and the DC voltage Vdc. The drive motor torque TM configures the motor machine torque, and the drive motor target torque TM* configures the motor machine target torque.

Therefore, a velocity detection processing module (not shown) of the drive motor control unit 45 conducts a velocity detection process. It detects the velocity V corresponding to the drive motor rotational speed N based on the drive motor rotational speed N, and sends the detected velocity V to a vehicle control unit (not shown) which controls the overall electric car. A vehicle command value computation processing module of the vehicle control unit conducts a vehicle command value computation process. It reads the velocity V and the acceleration position α, computes the vehicle request torque TO* based on the velocity V and the acceleration position α, generates the drive motor target torque TM* in response to the vehicle request torque TO*, and sends it to the drive motor control unit 45.

In the drive motor control unit 45, the drive motor control processing module has a current command value computing part 46 as a current command value computation processing module, a field weakening control processing part 47 as a field weakening control processing module, a voltage command value computation processing part 48 as a voltage command value computation processing module, a three-phase/two-phase converting part 49 as a first phase conversion processing module, and a PWM generator 50 as an output signal generation processing module.

In the embodiment, the drive motor control unit 45 conducts feedback control by vector control computing on the d-q coordinates where the d-axis is taken in the direction of the magnetic pole pair in the rotor and the q-axis is taken in the direction orthogonal to the d-axis.

In order to conduct a current command value computation process, the current command value computing part 46 has a torque command value limiting part 22 as a torque command value limitation processing module, a d-axis current command value computing part 53 and a subtracter 55, which are a first current command value computation processing module, and a q-axis current command value computing part 54 as a second current command value computation processing module. The d-axis current command value computing part 53 and the subtracter 55 conduct a first current command value computation process. They compute the d-axis current command value id* as a first current command value indicative of the target value of the d-axis current id. The q-axis current command value computing part 54 conducts a second current command value computation process. It computes the q-axis current command value iq* as a second current command value indicative of the target value of the q-axis current iq. In addition, the subtracter 55 configures a current command value adjustment processing module.

The field weakening control processing part 47 has a subtracter 58 as a voltage saturation calculation value computation processing module and an integrator 59 as a voltage saturation determination processing module and an adjusted value computation processing module. It conducts a field weakening control process, and automatically performs field weakening control when the battery voltage drops or the drive motor rotational speed N becomes high.

In order to conduct a voltage command value computation process, the voltage command value computation processing part 48 has a current control part 61, as a current control processing module, and a voltage control part 62, as a voltage control processing module. The current control part 61 conducts a current control process, and computes the d-axis voltage command value vd* and the q-axis voltage command value vq* as first and second axis voltage command values. The voltage control part 62 has a voltage phase angle computing part 64 as a first vector axis voltage command value computation processing module and a voltage phase angle computation processing module, a voltage amplitude computing part 63 as a second vector axis voltage command value computation processing module and a voltage amplitude computation processing module, and an adder 65 as a second phase conversion processing module and a voltage phase angle conversion processing module. The voltage control part 62 conducts a voltage control process, and computes the voltage amplitude value m and the voltage phase angle γ as first and second vector axis voltage command values. The d-axis voltage command value vd* and the q-axis voltage command value vq* provide the voltage command values.

In order to conduct an output signal generation process, the PWM generator 50 has an overmodulated PWM pattern generating part 72 as an overmodulated PWM pattern generation processing module, a sine wave PWM pattern generating part 73 as a sine wave PWM pattern generation processing module, a five-pulse pattern generating part 74 as a first pulse pattern generation processing module and a five-pulse pattern generation processing module, a one-pulse pattern generating part 75 as a second pulse pattern generation processing module and a one-pulse pattern generation processing module, and a voltage mode switching part 77 as a voltage mode switching processing module. The PWM generator 50 selects one pattern among first to fourth patterns of an overmodulated PWM pattern, a sine wave PWM pattern, a five-pulse pattern and a one-pulse pattern, generates as output signals the pulse width modulation signals Mu, Mv, Mw being the asynchronous PWM signals or the synchronous PWM signals in the individual phases in the selected pattern, and sends them to the drive circuit 51.

The drive circuit 51 receives the pulse width modulation signals Mu, Mv, Mw in the individual phases to generate six drive signals, and sends each of the drive signals to the inverter 40. The inverter 40 switches the transistors Tr1 to Tr6 based on the pulse width modulation signals Mu, Mv, Mw to generate the currents Iu, Iv, Iw in the individual phases, and feeds the currents Iu, Iv, Iw in the individual phases to the individual stator coils 11 to 13 of the drive motor 31. In this manner, torque control is conducted based on the drive motor target torque TM* to drive the drive motor 31 for running the electric car.

Subsequently, the current command value computing part 46 reads the drive motor target torque TM*, the angular velocity ω, and the DC voltage Vdc, computes the d-axis current command value id* and the q-axis current command value iq* indicative of the target values of the d-axis current id and the q-axis current iq, and sends them to the current control part 61.

Figure 3:
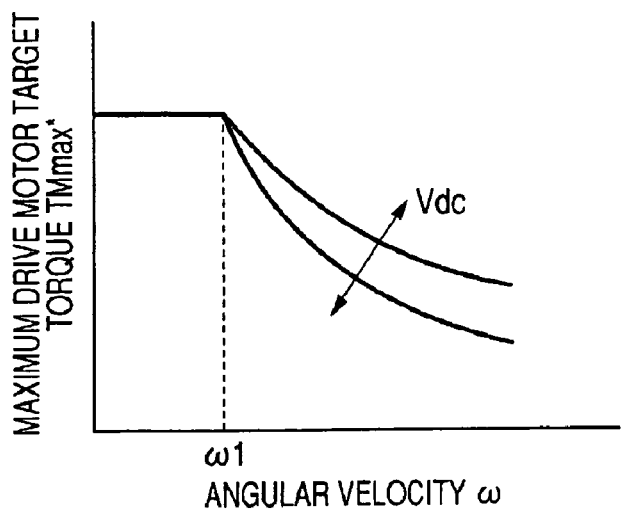
FIG. 3 is a diagram illustrating a maximum drive motor target torque map of the first exemplary embodiment.

Thus, when the vehicle command value computation processing module sends the drive motor target torque TM* to the drive motor control unit 45, the torque command value limiting part 22 conducts a torque command value limitation process. It reads the DC voltage Vdc, the angular velocity ω, and the drive motor target torque TM*, refers to the maximum drive motor target torque map, shown in FIG. 3 (in which the angular velocity ω is on the horizontal axis, and the maximum drive motor target torque TMmax* is on the longitudinal axis set in the recording unit), reads the DC voltage Vdc and the maximum drive motor target torque TMmax* indicative of the maximum value of the drive motor target torque TM* corresponding to the angular velocity ω, and confines the drive motor target torque TM* so as not to exceed the maximum drive motor target torque TMmax*. The maximum drive motor target torque map provides the maximum motor machine target torque map, and the maximum drive motor target torque TMmax* is the maximum motor machine target torque.

When the angular velocity ω is equal to or below a predetermined value ω1 in the maximum drive motor target torque map, the maximum drive motor target torque TMmax* takes a constant value. When the angular velocity ω exceeds the predetermined value ω1, the maximum drive motor target torque TMmax* is reduced in a curved form. In the area where the angular velocity ω exceeds the predetermined value ω1, the maximum drive motor target torque TMmax* is set so that it is greater when the DC voltage Vdc is higher whereas it is smaller when the DC voltage Vdc is lower.

Figure 4:
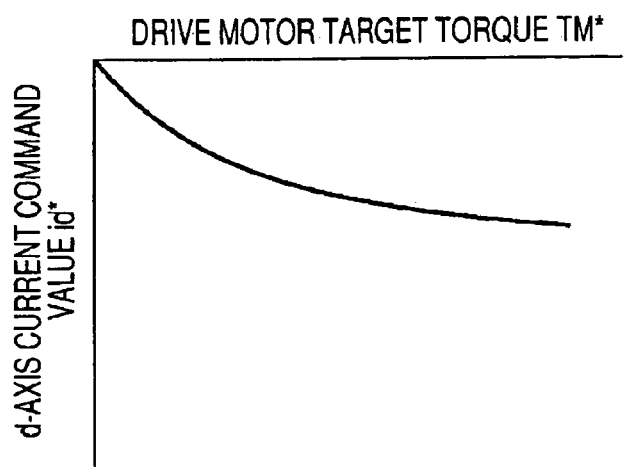
FIG. 4 is a diagram illustrating a first current command value map of the first exemplary embodiment.

Subsequently, the d-axis current command value computing part 53 conducts a first current command value computation process and a maximum torque control process. It receives the drive motor target torque TM* confined in the torque command value limiting part 22, refers to the first current command value map, shown in FIG. 4 (in which the drive motor target torque TM* indicative of the target value of the drive motor torque being torque of the drive motor 31 is on the horizontal axis, and the d-axis current command value id* is on the longitudinal axis), set in the recording unit, reads the d-axis current command value id* corresponding to the drive motor target torque TM*, and sends the d-axis current command value id* to the current control part 61 through the subtracter 55.

In this case, in the first current command value map, the d-axis current command value id* is set so that the absolute value of the command value for the current amplitude is minimized in order to achieve the drive motor target torque TM*. In the first current command value map, the drive motor target torque TM* takes a positive value, whereas the d-axis current command value id* takes a negative value. When the drive motor target torque TM* is zero, the d-axis current command value id* is set to zero, and the d-axis current command negative value id* is set so as to increase in absolute value as the drive motor target torque TM* increases.

Figure 5:
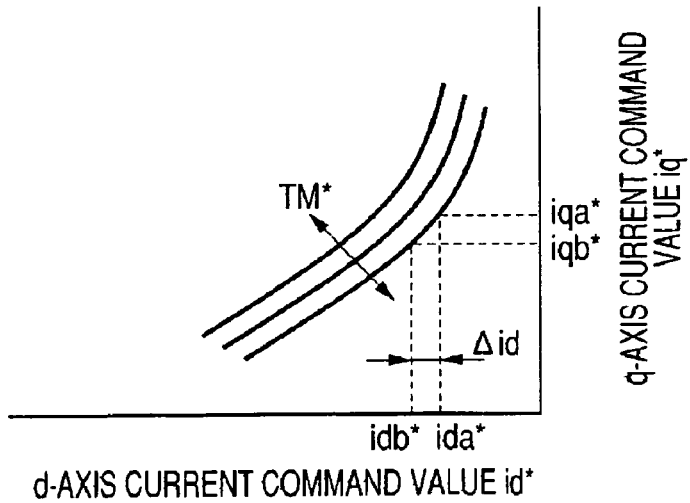
FIG. 5 is a diagram illustrating a second current command value map of the first exemplary embodiment.

When the d-axis current command value id* is computed in this manner, the q-axis current command value computing part 54 reads the drive motor target torque TM* confined in the torque command value limiting part 22 and the d-axis current command value id*, refers to the second current command value map, shown in FIG. 5 (in which the d-axis current command value id* is on the horizontal axis and the q-axis current command value iq* is on the longitudinal axis), set in the recording unit, computes the drive motor target torque TM* and the q-axis current command value iq* corresponding to the d-axis current command value id*, and sends the q-axis current command value iq* to the current control part 61.

In the second current command value map, the d-axis current command negative value id* is set so as to increase in absolute value and the q-axis current command value iq* is set so as to increase in the positive direction as the drive motor target torque TM* increases, whereas the d-axis current command negative value id* is set so as to decrease in absolute value and the q-axis current command value iq* is set so as to decrease in the positive direction as the drive motor target torque TM* is reduced. In the case where the drive motor target torque TM* is constant, when the d-axis current command negative value id* is increased in absolute value, the q-axis current command value iq* is reduced in the positive direction.

The three-phase/two-phase converting part 49 conducts three-phase/two-phase conversion as a first phase conversion process. It reads the magnetic pole position θ, converts the detected currents iu, iv, iw to the d-axis current id and the q-axis current iq, computes the d-axis current id and the q-axis current iq as real currents, and sends them to the current control part 61. The current control part 61 receives the d-axis current command value id* sent from the d-axis current command value computing part 53 through the subtracter 55 and the q-axis current command value iq* sent from the q-axis current command value computing part 54, receives the d-axis current id and the q-axis current iq from the three-phase/two-phase converting part 49, and then conducts feedback control.

To this end, the current control part 61 computes the current deviation δid between the d-axis current command value id* and the d-axis current id and the current deviation δiq between the q-axis current command value iq* and the q-axis current iq, and performs proportional integral computing formed of proportional control and integral control based on the current deviations δid, δiq.

More specifically, the current control part 61 computes the voltage drop Vzdp indicative of the voltage command value of the proportional component and the voltage drop Vzdi indicative of the voltage command value of the integral component based on the current deviation δid, and adds the voltage drops Vzdp, Vzdi with each other to compute the voltage drop Vzd:

$$Vzd=Vzdp+Vzdi.$$

The current control part 61 reads the angular velocity ω and the q-axis current iq, computes the induced voltage ed induced by the q-axis current iq based on the angular velocity ω, the q-axis current iq, and the q-axis inductance Lq:

$$ed=\omega \cdot Lq \cdot iq.$$

It subtracts the induced voltage ed from the voltage drop Vzd, and computes the d-axis voltage command value vd* as output voltage:

$$vd^*=Vzd-ed$$
$$=Vzd-\omega \cdot Lq \cdot iq.$$

The current control part 61 computes the voltage drop Vzqp indicative of the voltage command value of the proportional component based on the current deviation δiq and the voltage drop Vzqi indicative of the voltage command value of the integration term, adds the voltage drops Vzqp, Vzqi with each other, and computes the voltage drop Vzq:

$$Vzq=Vzqp+Vzqi.$$

The current control part 61 reads the angular velocity ω and the d-axis current id, computes the induced voltage eq induced by the d-axis current id based on the angular velocity ω, the reverse voltage constant MIf, the d-axis current id, and the inductance Ld on the d-axis:

$$eq=\omega(MIf+Ld \cdot id).$$

It adds the induced voltage eq to the voltage drop Vzq, and computes the q-axis voltage command value vq* as output voltage:

$$vq^* = Vzq + eq$$
$$= Vzq + \omega(MIf + Ld \cdot id).$$

Subsequently, the voltage control part 62 reads the d-axis voltage command value vd*, the q-axis voltage command value vq*, the DC voltage Vdc and the magnetic pole position θ, computes the voltage amplitude value m and the voltage phase angle γ on the d-q coordinates, converts the voltage phase angle γ to the voltage phase angle β on the fixed coordinates, and sends the voltage amplitude value m and the voltage phase angle β to the PWM generator 50.

Thus, the voltage phase angle computing part 64 conducts a first voltage command value computation process and a voltage phase computation process. It computes the voltage phase angle γ on the d-q coordinates:

$$\gamma = \arctan(vq^*/vd^*).$$

It sends the voltage phase angle to the voltage amplitude computing part 63 and the adder 65. The adder 65 conducts a second phase conversion process and a voltage phase angle conversion process. It adds the magnetic pole position θ to the voltage phase angle γ, and computes the voltage phase angle β on the fixed coordinates:

$$\beta = \gamma + \theta.$$

The voltage amplitude computing part 63 conducts a second voltage command value computation process and a voltage amplitude computation process. It computes the value that the voltage amplitude |v| is divided by the DC voltage Vdc, that is, the voltage amplitude value m:

$$|v| = \sqrt{vd^2 + vq^2} \quad (1)$$

$$m = |v|/Vdc \quad (2)$$
$$= \sqrt{vd^2 + vq^2}\,/\,Vdc.$$

The voltage amplitude computing part 63 sends the value m to the PWM generator 50.

However, in the drive motor 31, the counter electromotive force is generated in association with the rotor rotating. The higher the drive motor rotational speed N, the higher the terminal voltage of the drive motor 31 becomes. When the terminal voltage exceeds the threshold, voltage saturation is generated and the drive motor 31 cannot output the power but does not stop.

Therefore, a voltage saturation determination index computation processing module (not shown) of the voltage control part 62 conducts a voltage saturation determination index computation process. It sends the voltage amplitude value m as a voltage saturation determination index to the subtracter 58, the value being indicative of the degree of voltage saturation.

The subtracter 58 conducts a voltage saturation calculation value computation process. It subtracts the constant k (it is 0.78 in the embodiment) from the voltage amplitude value m where the threshold indicative of the maximum output voltage of the inverter 40 is set to the comparison value Vmax:

$$Vmax = k \cdot Vdc.$$

It computes the voltage saturation calculation value ΔV:

$$\Delta V = m - k.$$

The subtractor 58 then sends the value to the integrator 59.

Subsequently, the integrator 59 conducts a voltage saturation determination process and an adjusted value computation process. It integrates the voltage saturation calculation value ΔV at every control timing, and computes the integrated value ΣΔV. When the integrated value ΣΔV takes a positive value, it multiplies the integrated value ΣΔV by the proportional constant to compute and sets the adjusted value Δid for field weakening control. When the voltage saturation calculation value ΔV or the integrated value ΣΔV takes a value equal to or below zero, the adjusted value Δid is set to zero.

The subtracter 55 conducts a current command value adjustment process. It receives the adjusted value Δid, subtracts the adjusted value Δid from the d-axis current command value id* to adjust the d-axis current command value id*, and sends the adjusted value Δid to the q-axis current command value computing part 54 and the current control part 61.

In this case, when the adjusted value Δid takes the value zero, the d-axis current command value id* is not substantially adjusted, and field weakening control is not conducted. On the other hand, when the adjusted value Δid takes a positive value, the d-axis current command value id* is adjusted to increase the negative value in absolute value for field weakening control.

Therefore, when the adjusted value Δid is zero, the field weakening control is not conducted. Thus, the adjusted value Δid is sent to the q-axis current command value computing part 54, and the value of the q-axis current command value iq* is set to iqa* in the q-axis current command value computing part 54. In the case where the adjusted value Δid takes a positive value and field weakening control is conducted, when the value of the d-axis current command value id* sent to the subtracter 55 is ida*, for example, the d-axis current command value id* is formed by the subtracter 55 to the value idb* that is greater by the adjusted value Δid in the negative direction. The value is sent to the q-axis current command value computing part 54. The q-axis current command value iq* is decreased in the positive direction more than the value iqa* in the q-axis current command value computing part 54, and is the value iqb*.

As described above, when the PWM generator 50 receives the voltage amplitude value m and the voltage phase angle β, it conducts the output signal generation process. It selects one pattern among the overmodulated PWM pattern, the sine wave PWM pattern, the five-pulse pattern, and the one-pulse pattern, and generates the pulse width modulation signals Mu, Mv, Mw in the individual phases in the selected pattern. The five-pulse pattern configures a pulse pattern formed of multiple (odd-numbered) pulses. In the embodiment, the five-pulse pattern configures a first pulse pattern formed of five pulses, whereas the one-pulse pattern configures a second pulse pattern formed of a single pulse.

Figure 1:
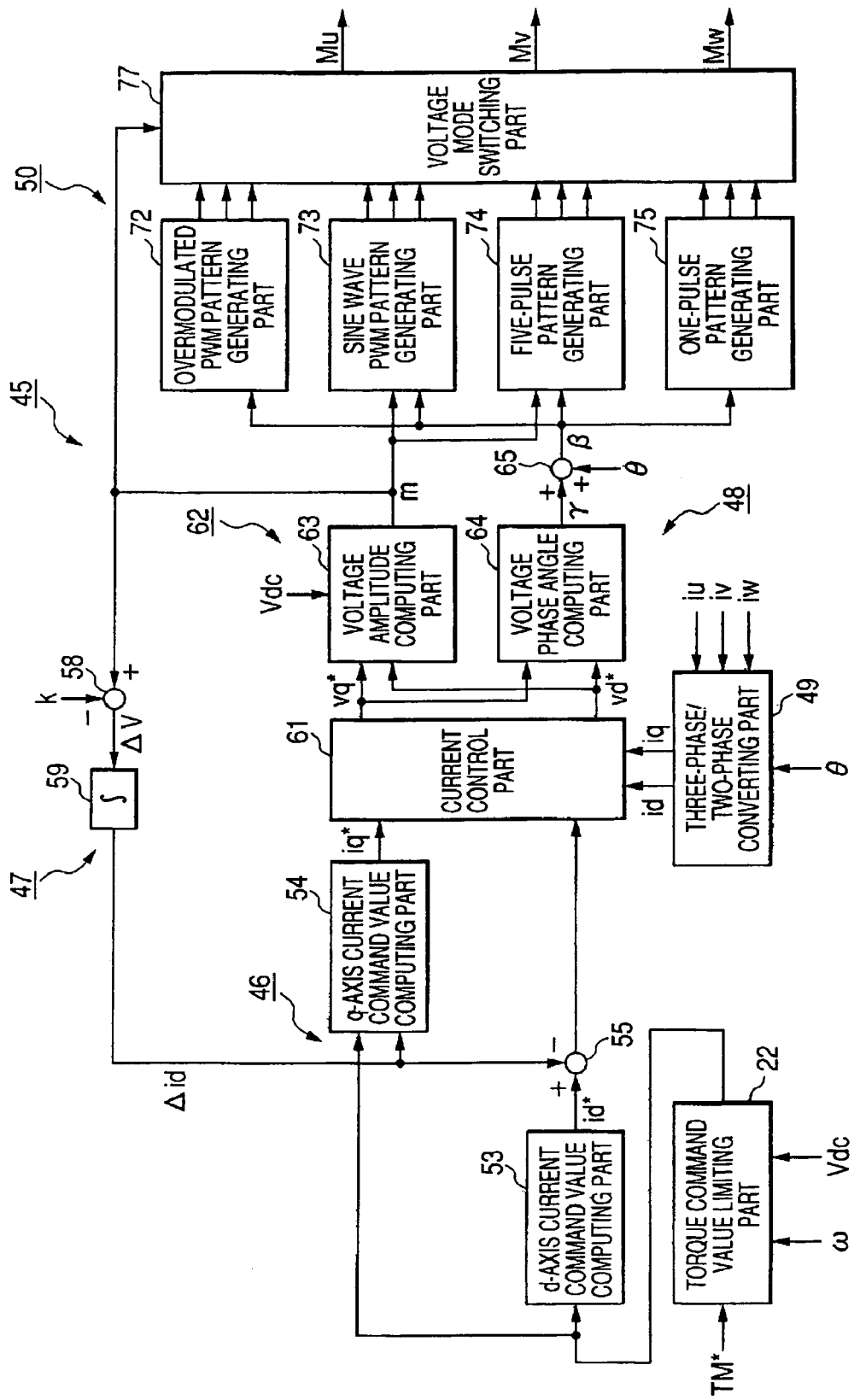
FIG. 1 is a block diagram illustrating a drive motor control unit of a first exemplary embodiment.
Figure 6:
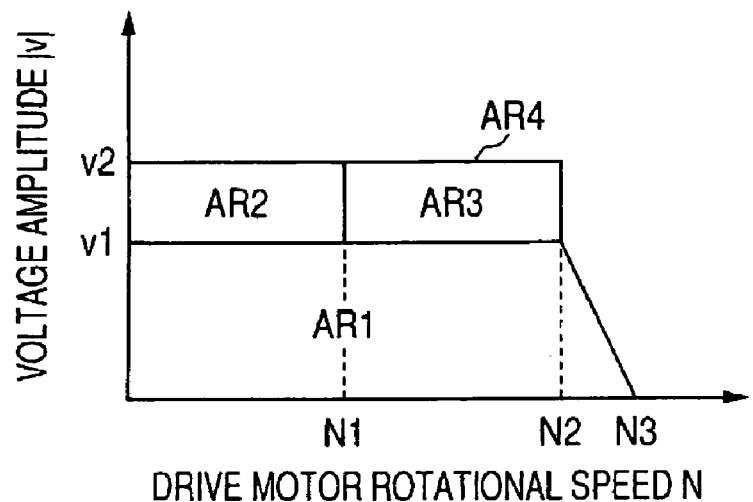
FIG. 6 is a diagram for describing a voltage mode switching process of the first exemplary embodiment.

Next, the operation of the PWM generator 50 will be described. In this case, as shown in FIG. 6 (the percent modulation ρ indicative of the voltage utilization rate is on the horizontal axis, and first and second parameters θ1, θ2 are on the longitudinal axis), in an area AR1 where the voltage amplitude |v| is lower than a first value v1, the voltage mode switching part 77 (FIG. 1) conducts a voltage mode switching process. It receives the asynchronous PWM signal in a sine wave PWM pattern generated in the sine wave PWM pattern generating part 73, and sends it to the drive circuit 51 (FIG. 2). The area AR1 configures the sine wave area.

Therefore, the sine wave PWM pattern generating part 73 conducts a sine wave PWM pattern generation process. It receives the voltage amplitude value m and the voltage phase angle β, generates sine waves in the individual phases based on the voltage amplitude value m and the voltage phase angle β, compares the sine waves and the triangular wave oscillated with a constant frequency and a constant amplitude, generates the pulse width modulation signals Mu, Mv, Mw formed of multiple pulses having unequal pulse widths, and sends the pulse width modulation signals Mu, Mv, Mw to the voltage mode switching part 77. In this manner, the asynchronous PWM control is done based on the asynchronous PWM signal generated in a sine wave PWM pattern. In the area AR1, when the drive motor rotational speed N exceeds a permissible value N2, the value of the acceptable voltage amplitude |v| is decreased, whereas when it becomes a limit value N3, the value of the acceptable voltage amplitude |v| is zero.

When the asynchronous PWM signal is generated, voltages in the individual phases are applied to the individual stator coils 11 to 13. However, the amplitude of voltage in the individual phases has an upper limit. When voltage applied exceeds the upper limit, vibrations are generated in the voltage amplitude value m and the voltage phase angle β.

Thus, when the voltage amplitude |v| is equal to or above the first value v1, an overmodulation area determination processing module (not shown) of the voltage mode switching part 77 conducts an overmodulation area determination process. It determines whether the voltage amplitude |v| is equal to or above the first value v1 and below the second value v2, and whether the drive motor rotational speed N falls in an area AR2 that is below a predetermined value N1. When the voltage amplitude |v| and the drive motor rotational speed N fall in the area AR2, it receives the asynchronous PWM signal in an overmodulated PWM pattern generated in the overmodulated PWM pattern generating part 72, and sends it to the drive circuit 51. The area AR2 defines the overmodulation area. The first value v1 is the maximum value of the voltage amplitude |v| when the asynchronous PWM signal is generated in the sine wave PWM pattern, and the second value v2 is the maximum value of the voltage amplitude |v| when the synchronous PWM signal is generated in the one-pulse pattern.

The overmodulated PWM pattern generating part 72 conducts an overmodulated PWM pattern generation process in the area AR2. It generates the portion equal to or above the first value v1 in the individual phases, that is, the peak value portion of the sine wave is cut off based on the voltage phase angle β, compares the sine wave and a triangular wave oscillated with a constant frequency and a constant amplitude, generates the pulse width modulation signals Mu, Mv, Mw formed of multiple pulses having unequal pulse widths, and sends the pulse width modulation signals Mu, Mv, Mw to the voltage mode switching part 77. In this manner, the asynchronous PWM control is conducted based on the asynchronous PWM signal generated in an overmodulated PWM pattern.

The switching timing by each of the transistors Tr1 to Tr6 of the inverter 40 is not synchronous with the voltage phase angle β. Therefore, when the drive motor 31 is driven in the high-speed rotation area, vibrations are generated in the voltages in the individual phases to cause a beat phenomenon.

Figure 7:
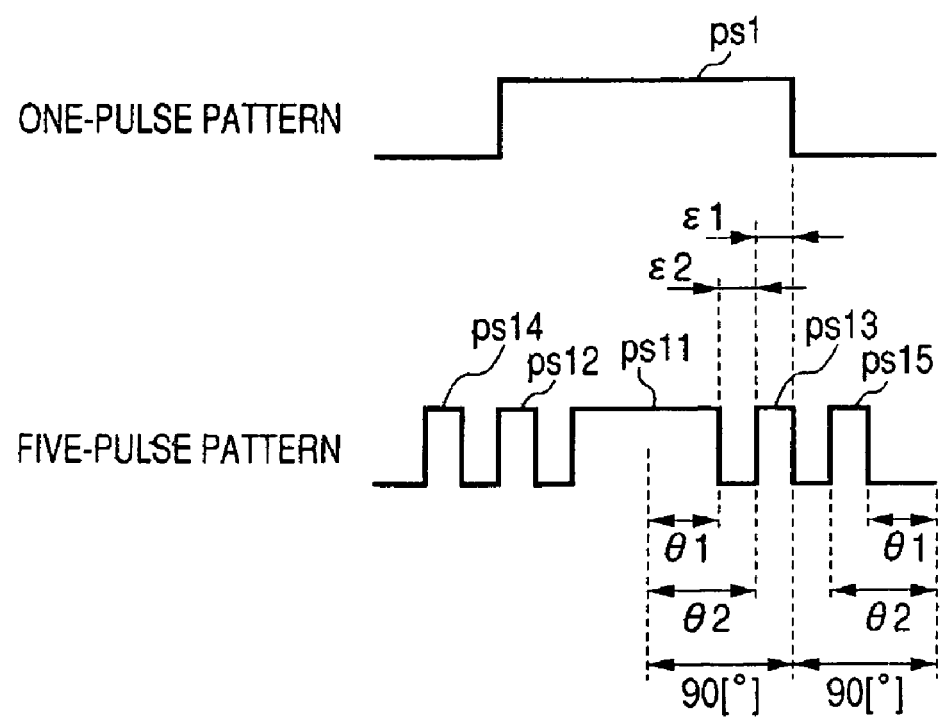
FIG. 7 is an illustration of pulse patterns of the first exemplary embodiment.

Switching between the asynchronous PWM control by the asynchronous PWM signal and the synchronous PWM control by the synchronous PWM signal is allowed. In the medium-speed rotation area or the low-speed rotation area where the drive motor rotational speed N is below the value N1, such as the area AR2, the asynchronous PWM signal is generated in the overmodulated PWM pattern for the asynchronous PWM control. In the high-speed rotation area where the voltage amplitude |v| is equal to or above the first value v1 and the drive motor rotational speed N is equal to or above the value N1, the synchronous PWM signal is generated in the one-pulse pattern formed of a single pulse ps1 in the range of ±180° as centering the origin point in the electrical angle as shown in FIG. 7 for one-pulse control in the synchronous PWM control. The pulse ps1 is formed in the range of ±90° as centering the origin point.

However, when the synchronous PWM signal is generated in the one-pulse pattern in the rectangular wave voltage control, voltage can be applied as it exceeds the upper limit of the amplitude of voltage to be applied to the individual stator coils 11 to 13. When the voltage amplitude |v| is equal to or above the first value v1 during the asynchronous PWM control in the sine wave PWM pattern in the area AR1, or when the drive motor rotational speed N exceeds the predetermined value N1 for the rectangular wave voltage control in the one-pulse pattern during the asynchronous PWM control in the overmodulated PWM pattern, an impulse is generated in the motor drive apparatus due to the harmonic component contained in the synchronous PWM signal in the one-pulse pattern.

An asynchronous/synchronous switching processing module (not shown) of the voltage mode switching part 77 conducts an asynchronous/synchronous switching process. In switching from the asynchronous PWM control to the synchronous PWM control, the asynchronous/synchronous switching processing module determines whether the voltage amplitude |v| is equal to or above the first value v1 and below the second value v2 and whether the drive motor rotational speed N falls in an area AR3 where the value is equal to or above the predetermined value N1. When the voltage amplitude |v| and the drive motor rotational speed N fall in the area AR3, it receives the synchronous PWM signal in the pulse pattern formed of multiple pulses defined in accordance with two or more parameters, that is, the synchronous PWM signal in the five-pulse pattern, as shown in FIG. 7, generated in the five-pulse pattern generating part 74 in the embodiment, and sends the signal to the drive circuit 51.

Therefore, the five-pulse pattern generating part 74 conducts a first pulse pattern generation process and a five-pulse pattern generation process. It receives the voltage amplitude value m and the voltage phase angle β, and generates the synchronous PWM signal in the five-pulse pattern, as shown in FIG. 7, based on the voltage amplitude value m and the voltage phase angle β, the signal having five pulses, ps11 to ps15, in the range of ±180° as centering the origin point. In this case, the pulse ps11 provides the basic pulse, and the pulses ps12 to ps15 provide the adjusting pulses. The pulses ps14 and ps15 are formed as the waveform is inverted in association with sign change. Suppose the pulse widths of the pulses ps12, ps13 are ε1, and the pulse widths between the pulse ps11 and each of the pulses ps12, ps13 is ε2. The pulse width between the pulses ps12, ps14 and the pulse width between the pulses ps13, ps15 are equal to the pulse width ϵ1, and the pulse widths of the pulses ps14, ps15 are equal to the pulse width ϵ2.

Suppose the interval from the origin point of the pulse ps11 to the trailing edge is a first parameter θ1, and the interval from the origin point to the trailing edge of pulse ps12 and the leading edge of pulse ps13 is a second parameter θ2. The second parameter θ2 is:

θ2 90[°]−ϵ1

=θ1+ϵ2.

A pulse pattern modification processing module (not shown) of the five-pulse pattern generating part 74 conducts a pulse pattern modification process. It modifies the first and second parameters θ1, θ2 of the five pulses ps11 to ps15 based on a change in the voltage amplitude value m, and moves and modifies the pulse pattern between the five-pulse pattern and the one-pulse pattern. Thus, the pulse pattern modification processing module computes the percent modulation ρ based on the voltage amplitude |v| and the second value v2:

ρ=|v|/(0.78×Vdc).

Figure 8:
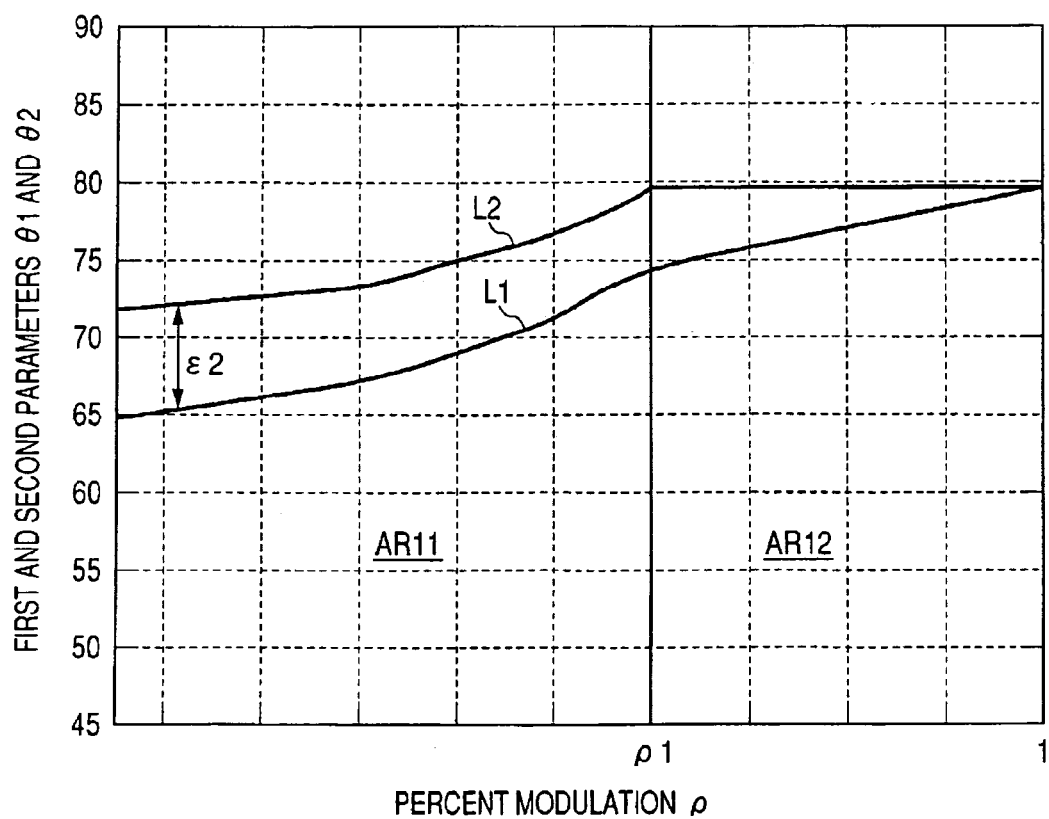
FIG. 8 is a diagram for describing a pulse pattern modification process of the first exemplary embodiment.

As shown in FIG. 8, the percent modulation ρ indicative of the voltage utilization rate is on the horizontal axis, and first and second parameters θ1, θ2 are on the longitudinal axis, it sets a harmonic reduction area AR11 where the percent modulation ρ is lower than the value ρ1 indicative of the switching point, and a transient area AR12 where the percent modulation ρ is equal to or greater than the value ρ1. In FIG. 8, L1 is a line indicating the first parameter θ1, and L2 is a line indicating the second parameter θ2.

In the embodiment, the first and second parameters θ1, θ2, at every percent modulation ρ, are predetermined to create the parameter map as shown in FIG. 8. The parameter map is stored in the recording unit, and the pulse pattern modification processing module refers to the parameter map to read the first and second parameters θ1, θ2 at every percent modulation ρ. The first and second parameters θ1, θ2 can be sequentially computed for each percent modulation ρ for storing.

Next, the computation method of the first and second parameters θ1, θ2 will be described. First, in the harmonic reduction area AR11, the first and second parameters θ1, θ2 are computed so that the harmonic component generated in the currents Iu, Iv, Iw in the individual phases can be suppressed. Therefore, the harmonic component of the voltage to be applied to the individual stator coils 11 to 13 is minimized. In the embodiment, the sum of squares of the fifth-order harmonic component and the seventh-order harmonic component is minimized.

In the meantime, each order of the harmonics can be expressed by the following Equation (1) where the interval from the origin point of the pulse ps11 to a predetermined point is θ', and the voltage of the predetermined point is v(θ'):

$$an = \frac{4}{\pi}\int_0^{\pi/2} v(\theta)\cos n\theta\, d\theta. \quad (3)$$

When the five-pulse pattern is generated in accordance with the first and second parameters θ1, θ2, the basic wave a1, the fifth-order harmonic component, and the seventh-order harmonic component can be expressed by the following Equations (3) to (6):

$$a1 = \frac{4}{\pi}(1 + 2\sin\theta1 - 2\sin\theta2); \quad (4)$$

$$a5 = \frac{4}{5\pi}(1 + 2\sin5\theta1 - 2\sin5\theta2); \quad (5)$$

$$a7 = \frac{4}{7\pi}(-1 + 2\sin7\theta1 - 2\sin7\theta2). \quad (6)$$

In addition, when the basic wave a1 is divided by the DC voltage Vdc, the percent modulation ρ is obtained.

Subsequently, suppose the sum of squares of the fifth-order harmonic component and the seventh-order harmonic component is the harmonic component index Min [σ], the harmonic component index Min [σ] is expressed by the following Equation (7):

$$\text{Min}[\sigma] = \sqrt{\left(\frac{a5}{5}\right)^2 + \left(\frac{a7}{7}\right)^2}. \quad (7)$$

In the harmonic reduction area AR11, the first and second parameters θ1, θ2 are computed so that the harmonic component index Min [σ] becomes the minimum. In this case, as described above, the first and second parameters θ1, θ2 are increased in association with an increase in the percent modulation ρ. However, when the percent modulation ρ becomes the value ρ1, the continuity of the first and second parameters θ1, θ2 cannot be maintained. More specifically, the value ρ1 is the maximum value that can maintain the continuity of the first and second parameters θ1, θ2.

Then, when the percent modulation ρ becomes the value ρ1, the computation scheme of the first and second parameters θ1, θ2 is switched. The area where the percent modulation ρ is from the value ρ1 to 1 is the transient area AR12. In the transient area AR12, the first parameter θ1 is a constant value and the second parameter θ2 is gradually brought close to the first parameter θ1. In addition, the second parameter θ2 can be a constant value, and the first parameter θ1 can be gradually brought close to the second parameter θ2.

In this case, when the basic wave a1 and the second parameter θ1 are specified, the second parameter θ2 can be computed by the following Equation (8).

$$\theta2 = \sin^{-1}\left(\frac{1}{2} + \sin\theta1 - \frac{\pi}{8}a1\right). \quad (8)$$

Subsequently, a pulse pattern switching processing module (not shown) of the voltage mode switching part 77 conducts a pulse pattern switching process. It determines whether the voltage amplitude |v| is the second value v2 and whether the drive motor rotational speed N falls in an area AR4 (FIG. 6) where the value is equal to or above the predetermined value N1. When the voltage amplitude |v| and the drive motor rotational speed N fall in the area AR4, it receives the synchronous PWM signal in the one-pulse pattern as shown in FIG. 7, and sends the signal to the drive circuit 51.

Therefore, the one-pulse pattern generating part 75 conducts a second pulse pattern generation process and a one-pulse pattern generation process. It receives the voltage phase angle β, and generates the synchronous PWM signal in the one-pulse pattern having a single pulse ps1, as shown in FIG. 7, based on the voltage phase angle β. In the pulse pattern modification process, when the percent modulation ρ becomes 1, the pulse width of the pulse ps11 in the five-pulse pattern is turned to ±90°. Thus, the synchronous PWM signal can be generated in the one-pulse pattern in association with the end of the five-pulse pattern generation process.

Accordingly, a change in the voltage to be applied to the individual stator coils 11 to 13 can be eliminated when the five-pulse pattern generation process is ended and when the one-pulse pattern generation process is started. Thus, generating an impulse in the motor drive apparatus can be prevented.

Direct switching from the five-pulse pattern to the one-pulse pattern is allowed, and it is unnecessary to generate the synchronous PWM signal in other pulse patterns, for example, in a three-pulse pattern between the five-pulse pattern and the one-pulse pattern. Thus, control can be simplified as well as the cost of the motor drive control apparatus can be decreased.

In addition to this, during the generation of the synchronous PWM signal in the five-pulse pattern, the generation of the harmonic component in the synchronous PWM signal and the currents Iu, Iv, Iw can be suppressed both in the harmonic reduction area AR11 and the transient area AR12. Thus, generating an impulse in the motor drive apparatus can be further prevented as well as preventing the generation of noise.

Moreover, the transient area AR12 is formed, and the first and second parameters θ1, θ2 are gradually made equal in the transient area AR12. Thus, the continuity of the pulse switching angle can be secured as well as minimum pulses can be prevented from being generated.

Figure 9:
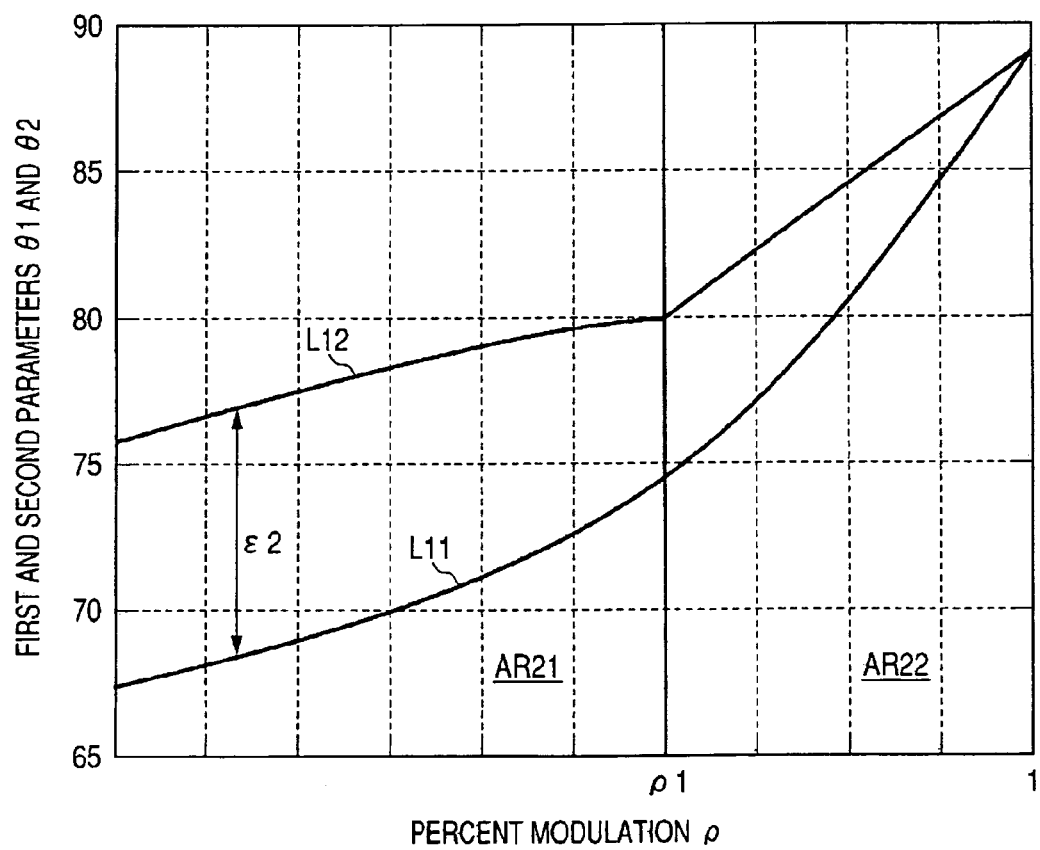
FIG. 9 is a diagram for describing a pulse pattern modification process of a second exemplary embodiment.

Next, a second exemplary embodiment will be described using FIG. 9 (the percent modulation ρ is on the horizontal axis, and the first and second parameters θ1 and θ2 are on the longitudinal axis). In this case, L11 is a line indicating the first parameter θ1, and L12 is a line indicating the second parameter θ2. The pulse pattern modification processing module of the five-pulse pattern generating part 74 (FIG. 1), as a first pulse pattern generation processing module and a five-pulse pattern generation processing module, conducts the pulse pattern modification process. It changes the first and second parameters θ1, θ2 of the five pulses, pulses ps11 to ps15 (FIG. 7) to modify the patterns. Therefore, the pulse pattern modification processing module sets a harmonic reduction area AR21 where the percent modulation ρ is lower than the value ρ1 indicative of the switching point and a transient area AR22 where the percent modulation ρ is equal to or greater than the value ρ1.

Subsequently, the pulse pattern modification processing module gradually increases the first parameter θ1 as the percent modulation ρ increases, and increases the second parameter θ2 in accordance therewith in the harmonic reduction area AR21. In this case, because the pulse width of the pulse ps11 is increased as the percent modulation ρ is increased, the amplitude of the voltage to be applied to the individual stator coils 11 to 13 can be increased gradually.

The pulse pattern modification processing module increases the second parameter θ2 at a predetermined rate as the percent modulation ρ is increased in the transient area AR22, increases the first parameter θ1 at a rate greater than the rate of the second parameter θ2, that is, increases the first parameter θ1 linearly, and gradually decreases the pulse width ε2. In this case, because the second parameter θ2 is given as proportional to the percent modulation ρ, the Equation (6) can be used to compute the first parameter θ1.

When the percent modulation ρ reaches 1, the pulse pattern modification processing module turns the pulse width of the pulse ps11 to nearly ±90°, makes it equal to the pulse width of the pulse ps1 in the one-pulse pattern, and turns the pulse width ε2 to zero.

In the exemplary embodiments, the five-pulse pattern is used as the first pulse pattern, but pulse patterns having odd-numbered pulses, such as a seven-pulse pattern, and a nine-pulse pattern can be used.

In the exemplary embodiments, the harmonic areas AR11, AR21 and the transient areas AR12, AR22 are set based on the percent modulation ρ. However, the harmonic areas AR11, AR21 and the transient areas AR12, AR22 can be set based on the voltage amplitude |v| or the voltage amplitude value m.

Therefore, the motor drive control apparatus as described, the pulse pattern modification processing module; can gradually modify the individual parameters so that a pulse width becomes zero when the voltage amplitude reaches a predetermined switching point;

can, in a harmonic reduction area where the voltage amplitude does not yet reach up to the switching point, set the individual parameters so that a harmonic component in voltage to be applied to a motor machine is suppressed;

can set the individual parameters so that a sum of squares of the harmonic components is minimized;

can set the individual parameters are set so that generation of a minimum pulse is suppressed in a transient area where the pulse width of the individual parameters becomes zero from the switching point;

when the individual parameters are set so that the harmonic component of voltage to be applied to a motor machine is suppressed, the switching point is a maximum value that can maintain continuity of the individual parameters;

can have the first pulse pattern formed of five or more pulses; and the voltage amplitude is a percent modulation.

The invention is not limited to the exemplary embodiments, which can be modified variously based on the teachings of the invention, and the modifications will not be excluded from the scope of the invention.

What is claimed is:

1. A motor drive control apparatus, comprising:
a first pulse pattern generation processing module which generates a synchronous PWM signal in a first pulse pattern formed of multiple pulses defined in accordance with two or more parameters based on a voltage command value; and
a second pulse pattern generation processing module which generates a synchronous PWM signal in a second pulse pattern formed of a single pulse based on a voltage command value, wherein the first pulse pattern generation processing module has a pulse pattern modification processing module which modifies the individual parameters based on a change in voltage amplitude in switching pulse patterns between the first pulse pattern and the second pulse pattern.

2. The motor drive control apparatus according to claim 1, wherein the pulse pattern modification processing module gradually modifies the individual parameters so that a pulse width becomes zero when the voltage amplitude reaches a predetermined switching point.

3. The motor drive control apparatus according to claim 2, wherein in a harmonic reduction area where the voltage amplitude reaches up to the switching point, the individual parameters are set so that a harmonic component in a voltage to be applied to a motor machine is suppressed.

4. The motor drive control apparatus according to claim 3, wherein the individual parameters are set so that a sum of squares of the harmonic components is minimized.

5. The motor drive control apparatus according to claim 2, wherein in a transient area where the pulse width of the individual parameters becomes zero from the switching point, the individual parameters are set so that a generation of a minimum pulse is suppressed.

6. The motor drive control apparatus according to claim 1, wherein the switching point is a maximum value that can maintain continuity of the individual parameters when the individual parameters are set so that the harmonic component of voltage to be applied to a motor machine is suppressed.

7. The motor drive control apparatus according to claim 2, wherein the switching point is a maximum value that can maintain continuity of the individual parameters when the individual parameters are set so that the harmonic component of voltage to be applied to a motor machine is suppressed.

8. The motor drive control apparatus according to claim 3, wherein the switching point is a maximum value that can maintain continuity of the individual parameters when the individual parameters are set so that the harmonic component of voltage to be applied to a motor machine is suppressed.

9. The motor drive control apparatus according to claim 4, wherein the switching point is a maximum value that can maintain continuity of the individual parameters when the individual parameters are set so that the harmonic component of voltage to be applied to a motor machine is suppressed.

10. The motor drive control apparatus according to claim 5, wherein the switching point is a maximum value that can maintain continuity of the individual parameters when the individual parameters are set so that the harmonic component of voltage to be applied to a motor machine is suppressed.

11. The motor drive control apparatus according to claim 1, wherein the first pulse pattern is formed of five or more pulses.

12. The motor drive control apparatus according to claim 1, wherein the voltage amplitude is a percent modulation.

13. The motor drive control apparatus according to claim 2, wherein the voltage amplitude is a percent modulation.

14. The motor drive control apparatus according to claim 3, wherein the voltage amplitude is a percent modulation.

15. The motor drive control apparatus according to claim 4, wherein the voltage amplitude is a percent modulation.

16. The motor drive control apparatus according to claim 5, wherein the voltage amplitude is a percent modulation.

17. The motor drive control apparatus according to claim 6, wherein the voltage amplitude is a percent modulation.

18. The motor drive control apparatus according to claim 7, wherein the voltage amplitude is a percent modulation.

19. A motor drive control method, comprising:
generating a synchronous PWM signal in a first pulse pattern formed of multiple pulses defined in accordance with two or more parameters based on a voltage command value; and
generating a synchronous PWM signal in a second pulse pattern formed of a single pulse based on a voltage command value, wherein the individual parameters are modified based on a change in voltage amplitude in switching pulse patterns between the first pulse pattern and the second pulse pattern.

20. A program of a motor drive control method which allows a computer to function as:
a first pulse pattern generation processing module which generates a synchronous PWM signal in a first pulse pattern formed of multiple pulses defined in accordance with two or more parameters based on a voltage command value; and
a second pulse pattern generation processing module which generates a synchronous PWM signal in a second pulse pattern formed of a single pulse based on a voltage command value, wherein the first pulse pattern generation processing module has a pulse pattern modification processing module which modifies the individual parameters based on a change in voltage amplitude in switching pulse patterns between the first pulse pattern and the second pulse pattern.

* * * * *